(12) United States Patent
Mittelstadt et al.

(10) Patent No.: US 6,279,570 B1
(45) Date of Patent: Aug. 28, 2001

(54) FILTER SUPPORT, ASSEMBLY AND SYSTEM

(75) Inventors: William A. Mittelstadt, Woodbury, MN (US); David M. Castiglione, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/260,942

(22) Filed: Mar. 2, 1999

(51) Int. Cl.[7] ............................ A62B 17/04; A62B 18/00
(52) U.S. Cl. ................................ 128/201.22; 128/201.23; 128/201.24; 128/201.25; 55/492; 55/DIG. 31; 55/DIG. 37
(58) Field of Search ................. 128/201.22, 201.23, 128/201.24, 201.25, 205.27, 205.29; 55/492, 494, 499, 508, DIG. 31, DIG. 37

(56) References Cited

U.S. PATENT DOCUMENTS

| | | | |
|---|---|---|---|
| Re. 30,782 | 10/1981 | van Turnhout . | |
| Re. 31,285 | 6/1983 | van Turnhout et al. . | |
| 2,124,370 | * 7/1938 | Gaarder | 55/488 |
| 3,385,038 | * 5/1968 | Davis | 55/499 |
| 3,505,795 | * 4/1970 | Wurtenberg | 55/500 |
| 4,047,914 | * 9/1977 | Hansen et al. | 55/488 |
| 4,136,688 | 1/1979 | Gorman . | |
| 4,215,682 | 8/1980 | Kubik et al. . | |
| 4,257,791 | 3/1981 | Wald . | |
| 4,280,491 | 7/1981 | Berg et al. . | |
| 4,363,643 | * 12/1982 | Elbrader et al. | 55/499 |
| 4,375,718 | 3/1983 | Wadsworth et al. . | |
| 4,462,399 | 7/1984 | Braun . | |
| 4,483,769 | * 11/1984 | Sherman | 210/282 |

(List continued on next page.)

FOREIGN PATENT DOCUMENTS

| | | |
|---|---|---|
| 29 41 573 A1 | 4/1981 | (DE) . |
| 284 412 A5 | 11/1990 | (DE) . |
| 856 328 A2 | 8/1998 | (EP) . |

OTHER PUBLICATIONS

*Rules and Regulations*, Federal Register: Part II, 60:110, pp. 30387–20296 (Jun. 8, 1995).

3M Positive Pressure Respirators: 3M Airhat PAPR Replacement Parts, 3M product literature, pp. 31 (Dec. 1996).

Wente et al., *Manufacture of Superfine Organic Fibers*, Report No. 4364 of the Naval Research Laboratories (May 25, 1954).

Wente, *Superfine Thermoplastic Fibers*, Industrial Engineering Chemistry, 48:1342 et seq. (1956).

Primary Examiner—John G. Weiss
Assistant Examiner—Joseph F. Weiss, Jr.
(74) Attorney, Agent, or Firm—Michaele A. Hakamaki

(57) ABSTRACT

A filter support that includes two or more first support ribs on a first side of the filter support is disclosed. The first support ribs are generally aligned along a longitudinal axis. The filter support also includes two or more second support ribs on a second side of the filter support, where the filter support's second side is opposite from the first side. The second support ribs are also generally aligned along the longitudinal first axis. At least one of the first support ribs is laterally offset from each of the second support ribs along a transverse axis that is generally perpendicular to the longitudinal axis. The filter support provides support to opposing sides of a filter bag or opposing individual filter elements. Also disclosed are a filter assembly including a filter and a filter support, along with a helmet-mounted powered air purifying respirator in which the filter assembly is located within the helmet crown.

14 Claims, 7 Drawing Sheets

U.S. PATENT DOCUMENTS

| | | |
|---|---|---|
| 4,588,537 | 5/1986 | Klaase et al. . |
| 4,592,815 | 6/1986 | Nakao . |
| 4,714,547 * | 12/1987 | Willinger .............................. 210/169 |
| 4,783,258 * | 11/1988 | Willinger et al. .................... 210/169 |
| 4,874,517 * | 10/1989 | Esch .................................. 210/493.5 |
| 5,035,239 | 7/1991 | Edwards . |
| 5,049,268 * | 9/1991 | Kopf ................................... 210/231 |
| 5,053,125 * | 10/1991 | Willinger et al. .................... 210/169 |
| 5,054,479 | 10/1991 | Yelland et al. . |
| 5,057,710 | 10/1991 | Nishiura et al. . |
| 5,125,402 | 6/1992 | Greenough . |
| 5,171,342 | 12/1992 | Trefz . |
| 5,232,589 * | 8/1993 | Kopf ................................... 210/228 |
| 5,283,914 | 2/1994 | James . |
| 5,496,507 | 3/1996 | Angadjivand et al. . |
| 5,653,831 * | 8/1997 | Spencer ................................ 156/69 |
| 5,728,293 * | 3/1998 | Guoli et al. .......................... 210/151 |
| 5,732,695 | 3/1998 | Metzger . |
| 5,800,587 | 9/1998 | Kahlbaugh et al. . |
| 5,989,320 * | 11/1999 | Rutkowski .............................. 96/55 |
| 6,063,167 * | 5/2000 | Rutkowski .............................. 96/55 |

* cited by examiner

FILTER SUPPORT, ASSEMBLY AND SYSTEM

The present invention pertains to filter supports, filter assemblies, including filter supports and powered air purifying respirators, including helmets in which filter assemblies including filter supports are mounted.

BACKGROUND

Respirators that filter air for breathing are frequently worn when individuals work in areas where air may be contaminated with toxic or noxious substances. Filtering respirators may operate under negative pressure, in which inhalation by the wearer draws air through the filter, or they may operate using positive pressure, in which a fan or other device supplies air to a wearer. A powered air purifying respirator (PAPR) typically includes a motor blower unit, a filter, and a power source (e.g., a battery pack). In some systems, these components reside on a belt around the waist of a user, with a tube conveying the purified air to a facemask, hood, helmet, etc. Belt or back-mounted equipment may, however, be subject to disengagement from the wearer during use and/or may also reduce the ability of the wearer to work in tight spaces.

Some PAPRS, such as the AIRSTREAM™ and AIRHAT™ (3M Company, St. Paul, Minn.), house these components inside a helmet to avoid the need to mount components on the user's back or belt. It is advantageous to locate the filter in helmet-mounted PAPRs within the crown space between the wearer's head and the helmet's outer shell. Locating the filter within the crown space can help to reduce the profile or size of the helmet as compared to helmet-based systems in which the filter is located outside of the crown space. Helmets with smaller profiles are desirable because they allow the wearer to work in smaller, tighter spaces than helmets with larger profiles.

Powered air purifying respirator performance is measured by parameters such as airflow, pressure drop across the filter during operation, efficiency in removing contaminants, and particulate loading capacity. Airflow and pressure drop are related because, for a given blower and power source, a filter with a smaller pressure drop will deliver higher airflow. Conversely, a filter with a larger pressure drop will deliver lower airflow using the same blower and power source. Airflow and pressure drop are important because, to provide the same amount of filtered air, a respirator system with a higher pressure drop filter requires more energy than a respirator system with a lower pressure drop filter.

Pressure drop for a given airflow rate across a filter can be decreased by increasing the openness or looseness of the filter material. A filter in which the openness or looseness of the filter material is increased, however, typically exhibits reduced efficiency in removal of contaminants, which is another one of the parameters by which powered air purifying respirator system performance is measured. Pressure drop for a given airflow rate can also be reduced without decreasing the efficiency of contaminant removal by increasing the size or surface area of the filter. Increasing the filter size, however, typically also includes increases in the size and/or bulk of the system. Such increases in size and/or bulk of the filter can increase the profile or size of helmet-mounted PAPRS, thereby potentially limiting the wearer's mobility in confined areas.

Helmet-mounted and other powered air purifying respirator systems used in connection with dust/mist filters have included filter bag holders that support the dust/mist filter bag inlet and/or the perimeter of the dust/mist filter bag. One such respirator system is disclosed in, e.g., U.S. Pat. No. 4,280,491 (berg et al.). The dust/mist filter bag holders typically provide only limited or no support through the center of the dust/mist filter bag because the airflow alone was sufficient to prevent kinking of the dust/mist filter bag materials.

Another filter support used in some helmet-mounted respirators is illustrated in FIG. 1. The filter bag holder 110 is designed to support a flat dust/mist filter bag in an arcuate form to fit within the crown of a helmet. The holder 110 is constructed of two members 112 and 114, with the smaller member 114 being held in compression to provide an opening 116 between the two members at one end thereof. Both members 112 and 114 include a plurality of openings 118 and 120, respectively, that are aligned along the length of the holder 110.

The filter bag holder 110 is manufactured of relatively flexible thermoformed polystyrene and is designed to allow a filter bag to billow outward from the filter support during operation. In other words, the filter bag holder 110 is designed primarily to maintain the filter bag in an arcuate shape.

New regulations promulgated by the National Institute of Occupational Safety and Health (NIOSH) for powered air purifying respirators, require the respirators to use High Efficiency Particulate Air (HEPA) class filters that remove 99.7% of a test aerosol. See 42 C.F.R. §84 (1995). To provide that level of contaminant removal efficiency, however, the filter materials used are typically significantly stiffer and/or heavier than the filter materials used in lower efficiency dust/mist filters.

Filters that provide HEPA class efficiency in helmet-mounted powered air purifying respirators can be provided in relatively rigid pleated media. When the pleated filters are located in a helmet's crown space, the pleated filter media are typically arcuately shaped as seen in, e.g., U.S. Pat. No. 4,462,399 (Braun). Shaped, pleated filters typically include the desired filter material along with the support structure required to maintain the shape of the pleats. The additional components increase the filters' cost and also typically increase the filters' bulk, resulting in higher shipping and storage costs. The helmet used with pleated filters may also be larger, thereby increasing the profile and limiting the wearer's maneuverability in confined spaces.

As compared to shaped pleated filters, filter bags are typically less expensive to manufacture, and are also less expensive to ship and store due to their smaller size. When used in connection with helmet-mounted respirators in which the filter bag must be arcuately-shaped to fit within a helmet crown, however, the stiffer material in flat HEPA class filter bags may tend to kink. Filter bag kinking may be particularly severe if the HEPA class filter bag is supported only about its perimeter as with some known filter bag holders.

Kinking creates flow obstructions that can reduce filter bag performance by increasing the pressure drop across the filter which can, in turn, reduce the airflow rates of the respirator system using the kinked filter bag. Filter bag kinking can also reduce the filter's effective area which, in turn, can also reduce the filter particulate loading capacity. As discussed above, particulate loading capacity is another one of the parameters by which filter performance is judged. Kinked filter bag areas are not evenly loaded with particulate matter during use, thereby reducing filter bag particulate loading capacity.

The filter bag holder 110 of FIG. 1 is another example of known filter bag holder designed for use with dust/mist filter bags and is typically incapable of preventing kinking of HEPA class filter bags. In addition, the holder 110 is formed of members that have relatively large surface areas. Those large surface area members can effectively block airflow to large areas of the filter, thereby increasing pressure drop and reducing particulate loading capacity.

SUMMARY OF THE INVENTION

In brief summary, the present invention provides, in one aspect, a filter support that includes two or more first support ribs on a first side of the filter support. The first support ribs are generally aligned along a longitudinal axis. The filter support also includes two or more second support ribs on a second side of the filter support, where the filter support's second side is opposite from the first side. The second support ribs are also generally aligned along the longitudinal first axis. At least one of the first support ribs is laterally offset from each of the second support ribs along a transverse axis that is generally perpendicular to the longitudinal axis.

The filter support provides support to opposing sides of a filter bag or opposing individual filter elements. By laterally offsetting the first and second support ribs relative to each other across the width of the filter support, airflow across the filter support's width is not as inhibited as it would be if the first and second support ribs were substantially aligned with each other. As a result, loading capacity may be improved because more of the filter material in a filter assembly including the filter support can be loaded with filtrate. In addition, pressure drop across a filter assembly using the filter support can be improved because of reduced flow restrictions provided by the laterally offset support ribs.

The present invention also provides, in other aspects, a filter assembly including a filter and a filter support as discussed above, along with a helmet-mounted powered air purifying respirator in which the filter assembly is located within the helmet crown.

Because the filter support of the invention includes support ribs that preferably separate and support the central portion of a filter bag in addition to its perimeter, the filter support may advantageously reduce or prevent kinking of a flat filter bag that must be arcuately shaped for use in a respirator system. This advantage may be most apparent when the filter bags are constructed of HEPA class filter material.

These and other features and advantages of the invention are described with respect to various illustrative embodiments of the invention below.

GLOSSARY

In reference to the invention, the following terms are defined as set forth below:

"crown space" means the space between a wearer's head and the concave side of a helmet having a crown;

"filter" or "filter material" mean a generally porous device or material designed to entrap or remove particulates, liquids, and/or gases from an airstream;

"filter bag" means a bag formed at least partially of filter material;

"filter support" means a device that maintains separation between opposing sides of a filter bag or between two opposing filter elements;

"generally aligned with the longitudinal axis" means that the support ribs progress along the longitudinal axis when moving from the input end of the filter support to the terminal end of the filter support.

"HEPA class" and "High Efficiency Particulate Air class" define the performance of filter material as set forth in 42 C.F.R. §84 (1995)

"laterally offset" means that the referenced structures are not aligned with each other along the relevant axis;

"longitudinal axis" means an axis that extends generally along the length of a filter support;

"support rib" means a structural member designed to support at least a portion of a filter; and "transverse axis" means an axis that extends generally perpendicular to the longitudinal axis.

DETAILED DESCRIPTION OF ILLUSTRATIVE EMBODIMENTS

Although the filter supports of the present invention may provide particular advantages when used in connection with helmet-mounted powered air purifying respirators, the filter supports may also be used in other systems or applications in which the opposing sides of filter bags must be separated without significantly restricting flow within the filter bag. In addition, the filter supports may also be used in connection with systems in which separation must be maintained between opposing filter elements.

Figure 1:
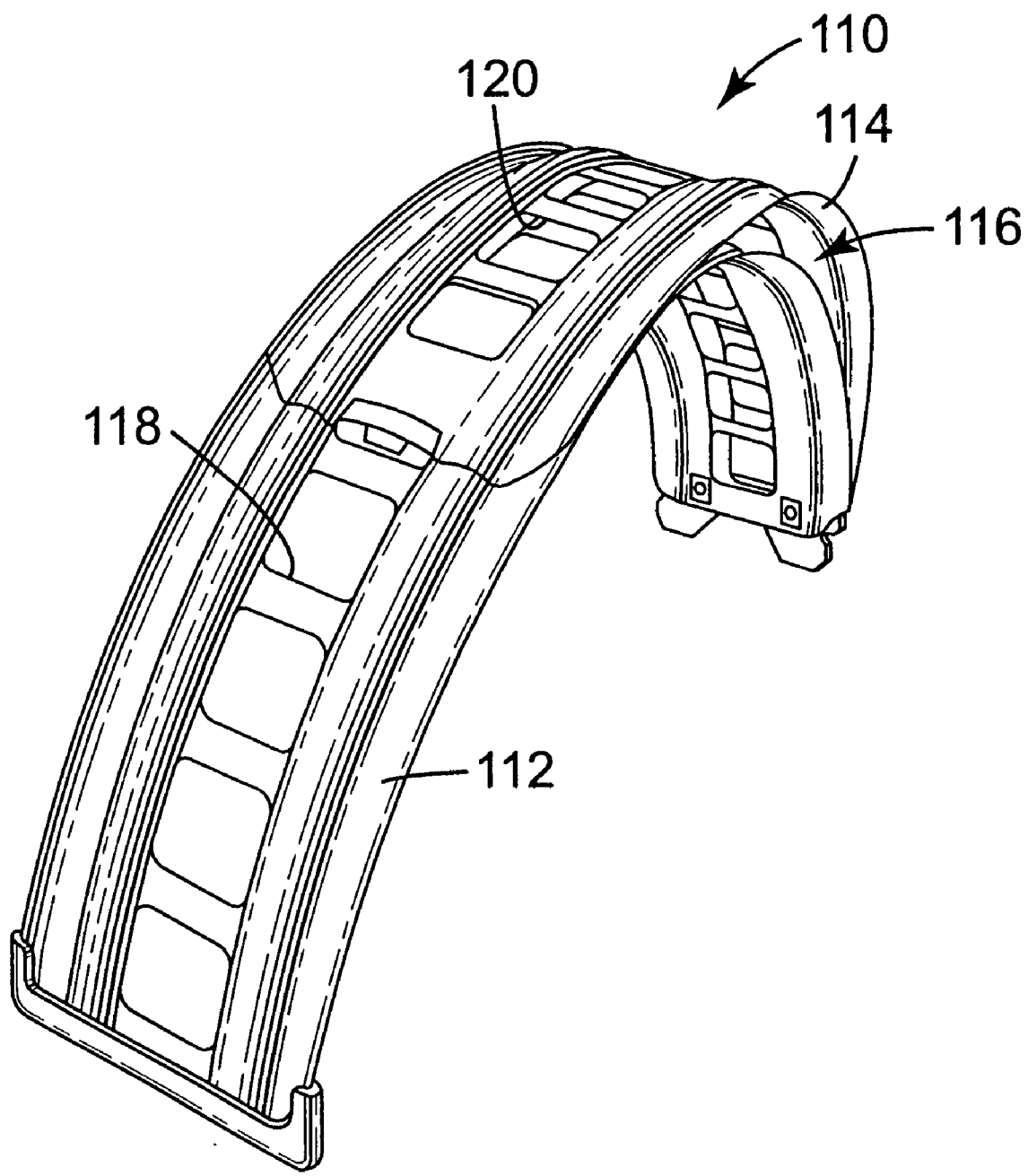
FIG. 1 is a perspective view of a prior art arcuate filter bag holder 110.
Figure 2:
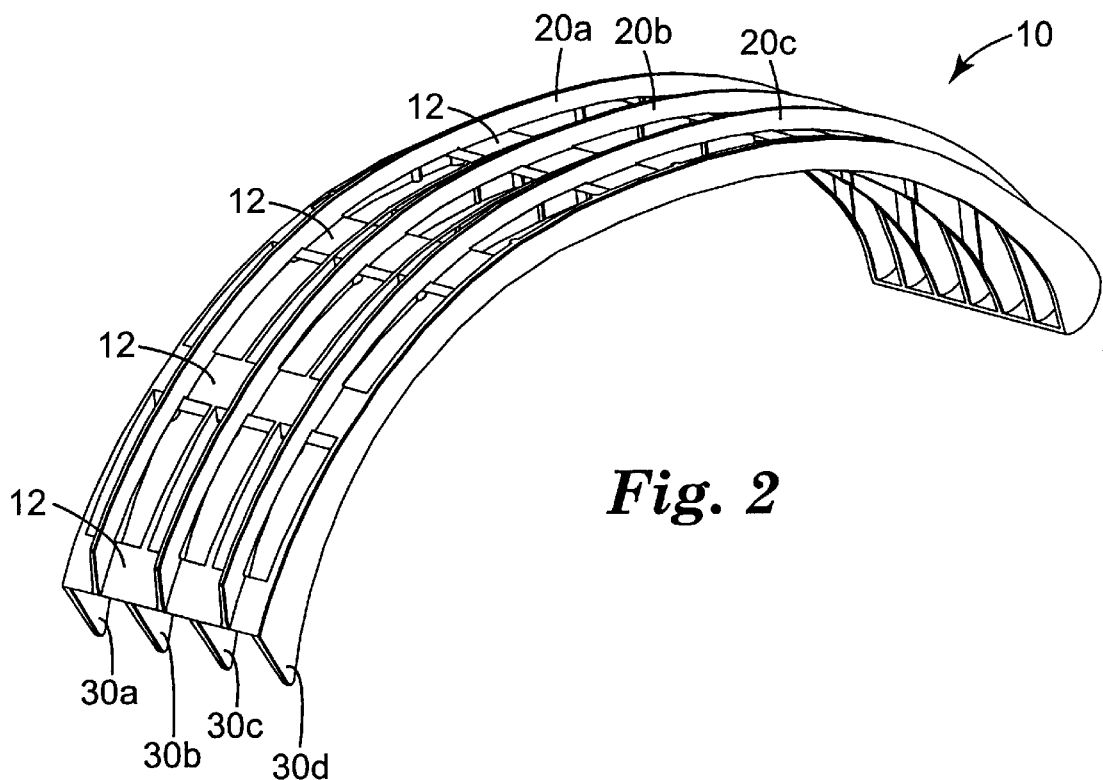
FIG. 2 is a perspective view of one filter support according to the present invention.
Figure 3:
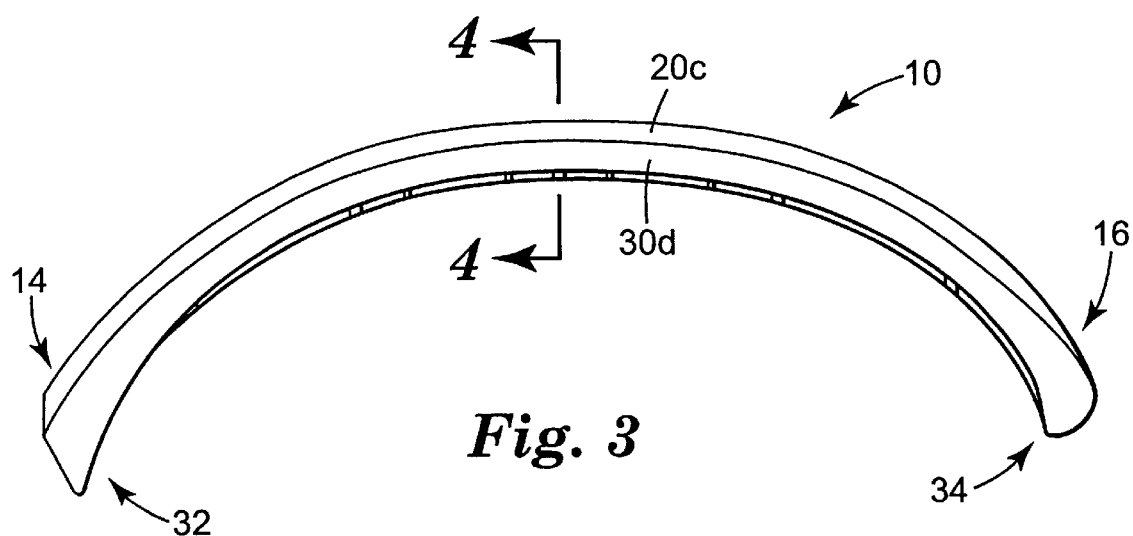
FIG. 3 is a side view of the filter support 10 depicted in FIG. 2.

FIGS. 2–5 depict one illustrative embodiment of a filter support 10 of the present invention having a length along a longitudinal axis 11 and a width along an axis 13 that is transverse to the longitudinal axis 11. Filter support 10 includes a plurality of support ribs 20a, 20b and 20c located on one side thereof The support ribs 20a–20c preferably extend along the length of the support 10. Also seen in FIG. 2 are a plurality of second support ribs 30a, 30b, 30c and 30d located on the opposite side of the support 10. Second support ribs 30a–30d also preferably extend over substantially the entire length of the filter support 10. A plurality of cross-supports 12 are located at spaced intervals along the filter support length and preferably extend across the width of the filter support 10. The cross-supports 12 preferably maintain spacing between the first support ribs 20a–20c and second support ribs 30a–30d.

The filter support 10 preferably has an arcuate shape and extends from an input end 14 to an terminal end 16. The arcuate shape is particularly preferred when the filter support 10 is to be used in connection with helmet-mounted powered air purifying respirators. The increasing height of the second support ribs 30a–30d at the input end 14 of the filter support 10 can be seen in, e.g., FIGS. 2 and 3. The height increase at the filter support input end 14 may reduce or prevent filter material kinking at the input end 14.

It is also desirable to reduce the frontal area of the filter support 10 along the length of the filter support 10 by minimizing the thickness of the structural components, such as the first support ribs 20a–20c, second support ribs 30a–30d and cross-supports 12.

Figure 4:
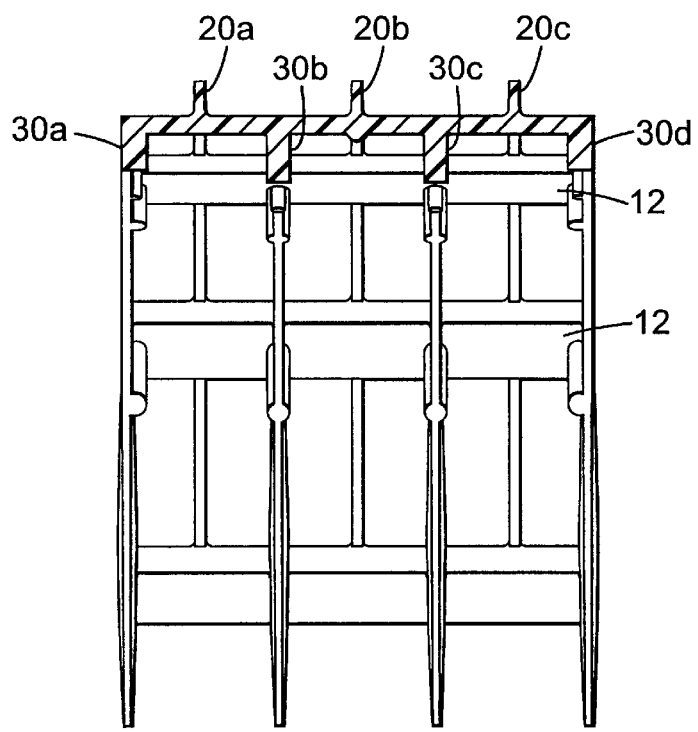
FIG. 4 is a cross-sectional view of the filter support 10 taken along line 4—4 in FIG. 3.

As seen in FIG. 4, filter support 10 includes first support ribs 20a, 20b and 20c on a first side of the filter support 10 and second support ribs 30a, 30b, 30c, and 30d on a second side of the filter support. Both sets of support ribs 20a–20c and 30a–30d are spaced across the filter support width. At least one of the first support ribs 20a–20c on the first side is laterally offset across the width of the filter support 10 from the second support ribs 30a–30d on the second side. It may be preferred, however, that all of the first support ribs 20a–20c are laterally offset from all of the second support ribs 30a–30d, as illustrated in FIG. 4.

By providing laterally offset support ribs on each side of the filter support 10, airflow is allowed to distribute crosswise in addition to lengthwise through the filter support 10. If the first support ribs 20a–20c were aligned with the second support ribs 30a–30d, the support ribs could create lengthwise channels. Airflow through the filter support 10 could then be restricted to substantially lengthwise movement along the channels, which may result in uneven flow distribution within the filter support. That uneven flow distribution may result in uneven particulate loading, which could limit the overall or ultimate particulate loading capacity of a filter bag located over filter support 10. The uneven flow caused by aligned support ribs would also likely increase pressure drop across a filter bag located over the filter support 10.

FIG. 4 illustrates another preferred feature of the present invention in that the outermost second support ribs 30a and 30d are shorter than the second support ribs 30b and 30c located between the outermost support ribs 30a and 30d. The reduced height of the outermost support ribs 30a and 30d may be particularly useful when the filter support 10 is used in connection with flat filter bags because the filter bag sides are typically joined in the area of the outermost support ribs 30a and 30d, thereby narrowing the bag. By reducing the outermost support rib height, stress on a flat filter bag's seams may be reduced.

Another preferred feature illustrated in FIG. 4 is the relative number of support ribs on either side of the filter support 10. The number of second support ribs 30a–30d on the concave second side of the preferred arcuate filter support 10 is preferably greater than the number of first support ribs 20 on the convex side of the preferred arcuate filter support 10. The support's concave side preferably includes more support ribs 30a–30d than the convex side on which first support ribs 20a–20c are located. More support ribs 30a–30d are preferred on the concave side to prevent kinking of the concave side of a filter bag located on the preferred arcuate support 10. As discussed above, filter bag kinking can limit flow, increase pressure drop and cause uneven particulate loading.

Figure 5:
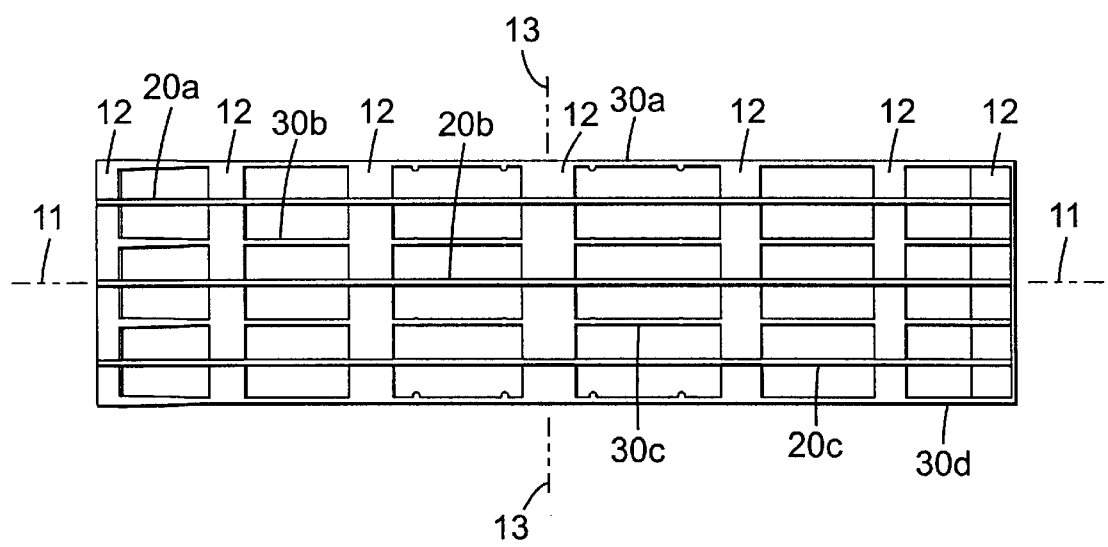
FIG. 5 is a plan view of the filter support 10.

FIG. 5 illustrates a plan view of the filter support 10 including a longitudinal axis 11 and a second transverse axis 13. Axis 13 is transverse to the longitudinal axis 11, meaning that the transverse axis 13 is generally perpendicular to the longitudinal axis 11. The first support ribs 20a–20c and second support ribs 30a–30d are preferably aligned with the longitudinal axis 11. Although the support ribs 20a–20c and 30a–30d are preferably aligned with longitudinal axis 11, they may exhibit slight variations in that alignment where such variations occur will not substantially affect airflow through the filter support 10. Cross-supports 12 illustrated in FIG. 5 are preferably distributed over the filter support length to maintain proper spacing between the support ribs 20a–20c and 30a–30d. The cross-supports 12 are optional, i.e., not every filter support may include them.

Although the illustrated cross-supports 12 are oriented generally transverse to the longitudinal axis 11, it should be understood that they need not necessarily be transverse to the longitudinal axis 11. Furthermore, although cross-supports 12 do extend across the width of the filter support 10 as seen in FIG. 5, cross-supports in other filter holders may extend only partially across the filter support width.

Filter supports 10 according to the present invention may be manufactured by a variety of techniques. It may be preferred to manufacture the filter supports of a moldable material using, e.g., injection molding techniques. Those skilled in the art will, however, envision many other ways in which filter supports according to the present invention could be manufactured.

Figure 6:
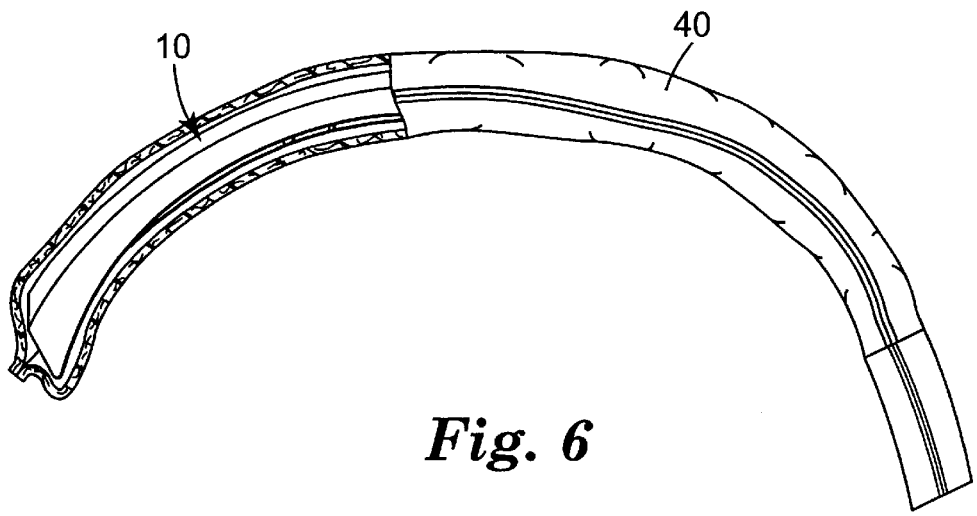
FIG. 6 is a side view of the filter support 10 located in a filter bag 40 which is depicted in a partial cross-sectional view.

FIG. 6 illustrates filter support 10 located within a filter bag 40. Preferred filter bags 40 used in connection with the filter support 10 are manufactured as flat filter bags. Flat filter bags are preferred because they are less expensive to manufacture than a shaped bag. Furthermore, with the addition of a separate filter support 10, as described above, the need for a shaped filter bag is reduced.

The filter support 10 is preferably more rigid than the filter bag 40 in which the filter support 10 is used. In other words, the filter bag 40 conforms to the shape of the filter support 10. The rigidity may facilitate insertion of the preferred arcuate filter support 10 and filter bag 40 into the crown space of a helmet.

The rigidity of the filter support 10 may also assist in maintaining separation between the opposing sides of the filter bag 40, even filter bags constructed of stiff HEPA class filter media. One preferred HEPA class filter media 42 is illustrated in the enlarged partial cross-sectional view of FIG. 6A.

The illustrated filter media 42 includes an innermost protective layer 44 of, e.g., a plastic mesh netting to protect the inner layers of the filter media 42 during filter support 10 insertion. The openings in the netting are preferably large enough to prevent caking on the netting itself during filter use. In one example, the netting is about 250 micrometers thick and includes strands forming diamond shaped openings, with about 3–6 strands per centimeter.

Figure 6A:
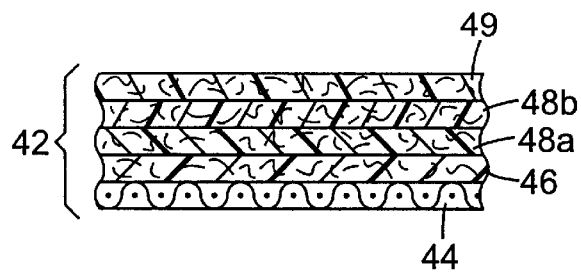
FIG. 6A is an enlarged cross-sectional view of one HEPA class filter material 42 useful in connection with the present invention.

A coarse filter layer 46 is located above the protective layer 44 in FIG. 6A and is preferably provided to entrap larger particulate matter. In one example, the coarse filter layer 46 is a lower density non-woven of electret charged fibers marketed under the tradename FILTRETE™ G150 by Minnesota Mining and Manufacturing Company, St. Paul, Minn.

Two layers 48a and 48b of a high efficiency filtration medium are provided above the coarse filter layer 46. Layers 48a and 48b may preferably be polypropylene based blown microfiber (BMF) webs as prepared according to methods described in U.S. patent application Ser. No. 09/146,627 filed on Sep. 3, 1998 to T. N. Wu et al. Those methods use a melt blowing process similar to that described in, for example, Wente, "Superfine Thermoplastic Fibers," *Industrial Engineering Chemistry,* Vol. 48, pp. 1342 et seq. (1956) or in Report No. 4364 of the Naval Research Laboratories, published May 25, 1954, entitled "Manufacture of Superfine Organic Fibers" by Wente et al. The relatively low basis weight was obtained by increasing the rotational speed of the collector rather than reducing the resin delivery rate. The BMF webs could be charged using a hydrocharging process substantially as described in U.S. Pat. No. 5,496,507 (Angadjivand et al.) using a water pressure of about 550 kPa. One suitable resin is Fina 3960, a 350 melt flow index polypropylene resin available from Fina Corp., Houston, Tex.

A charge enhancement package for the BMF webs could be prepared by the following method. Melt compounding CHIMASSORB™ 944FL (a hindered amine available from Ciba-Geigy Corp., Hawthorne, N.Y.) into poly(4-methyl-1-pentene) (TPX DX 820, available from Mitsui Petrochemical Industries, Tokyo, Japan) in a single screw extruder in a 40:60 ratio and extruding the resultant blend into a large diameter fiber. Grinding the large diameter fiber into a powder (0.125 inch mesh) and adding the ground fiber to the polypropylene pellet feed during preparation of the BMF webs. The BMF web composition could consist of 98 wt. % polypropylene and 2% of the charge enhancement package.

If prepared as discussed above, each of the layers 48a and 48b preferably has a thickness of about 0.3 mm, a basis weight of about 22 grams per meter and include fibers with an effective fiber diameter of 4.8 micrometers. When tested with a 0.3 micrometer DOP aerosol at a flow rate of 85 liters per minute, each of the layers 48a and 48b preferably exhibits a pressure drop of 5.5 mm of $H_2O$ and penetration of 0.03%.

The layers 48a and 48b are protected by a cover web 49 over the outside of the filter bag 40. One preferred cover web is a spun-bond nonwoven polypropylene and is chosen such that it provides the desired protection to the underlying filter layers without significantly reducing airflow through the filter 40.

All of the materials used in the filter 40 are preferably compatible with the desired technique used to bond the sides of the filter, e.g., ultrasonic welding, adhesive bonding, etc.

Examples of other filter materials that may be used in connection with the present invention are described in U.S. Pat. No. 4,592,815 (Nakao); U.S. Pat. No. 5,496,507 (Angadjivand et al.); U.S. Pat. No. 4,588,537 (Claase et al.); U.S. Pat. No. 4,375,718 (Wadsworth et al.); U.S. Pat. No. 4,215,682 (Kubik et al.); U.S. Pat. No. 5,057,710 (Nishiura et al.); U.S. Pat. No. Re 30,782 & U.S. Pat. No. Re 31,285 (both to van Turnhout).

Figure 7:
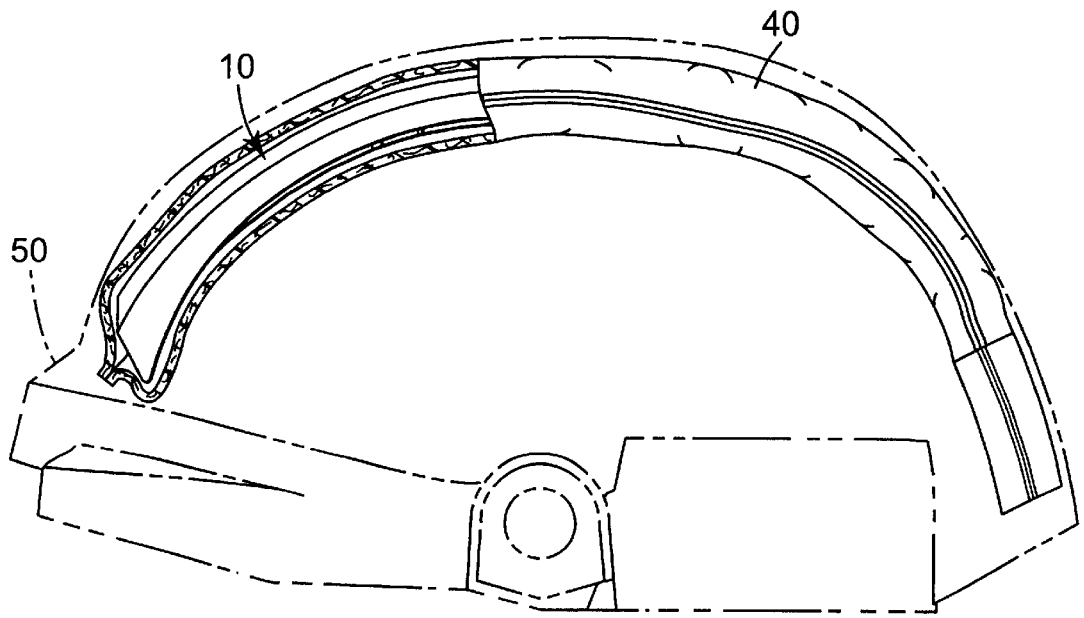
FIG. 7 is a side view of the filter support 10 and filter bag 40 located within a helmet 50 used in connection with a powered air purifying respirator.

The preferred arcuate filter support 10 imparts that arcuate shape to the filter bag 40 located over the filter support 10. The arcuate filter support 10 and associated filter bag 40 can be located within the crown of helmet 50, as illustrated in FIG. 7. Locating a filter within a helmet crown provides a number of advantages, as discussed in, for example, U.S. Pat. No. 4,280,491 (Berg et al) and U.S. Pat. No. 4,462,399 (Braun). Briefly, however, the use of the crown space in a helmet-based powered air purifying respirator can reduce the helmet profile as compared to helmet-mounted systems that do not use the crown space while also eliminating the need for belt or back-mounted blowers and/or power packs.

A further advantage in locating the arcuate filter support 10 and filter bag 40 within the helmet crown is the potential improvement in the helmet's ability to absorb impacts. When used in connection with some helmets, the filter support 10 may distribute the energy of an impact over a longer time period, thereby reducing the peak impact force experienced by a helmet wearer.

To facilitate impact absorption by the filter support 10, it may be preferred that the filter supports 10 be constructed of materials that provide good energy absorption and impact deflection characteristics over a wide temperature range. One such material is a blend of high density polyethylene and a thermoplastic elastomer. In one specific example, high density polyethylene was blended with a thermoplastic elastomer (10% by weight) to produce a filter support 10 that was particularly effective at reducing the peak impact forces experienced by a helmet wearer over a broad temperature range. The particular thermoplastic elastomer used is marketed under the trade name ENGAGE available from Dow Chemical Corp.

FIGS. 2–7 illustrate one embodiment of a filter support of the present invention and its use within a helmet mounted powered air purifying respiration system. FIGS. 8–17 illustrate alternative filter supports according to the present invention. Although the supports illustrated in FIGS. 8–17 are flat, i.e., not arcuate, they could alternatively be provided in an arcuate form for use in, e.g., a helmet crown space.

Figure 8:
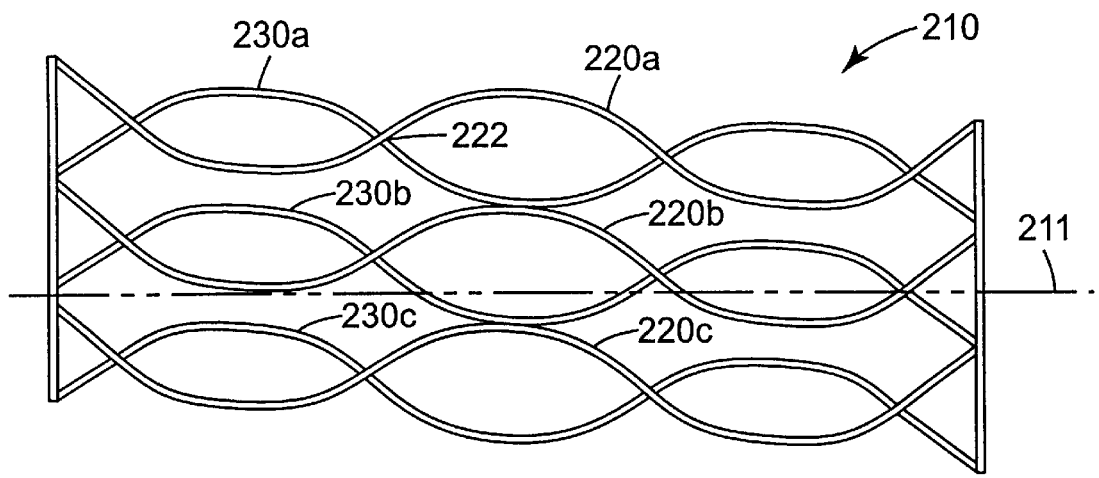
FIG. 8 is a plan view of another filter support 210 according to the present invention.
Figure 9:
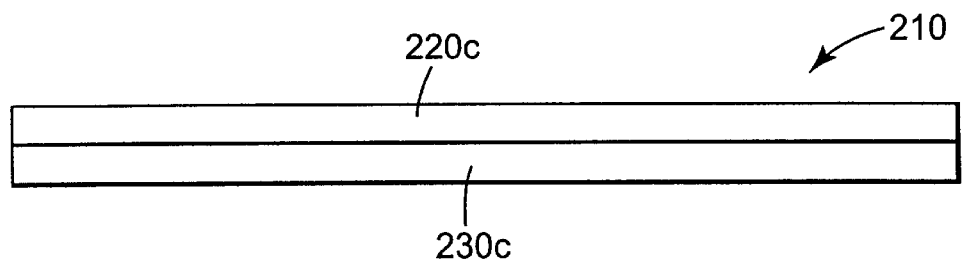
FIG. 9 is a side view of the filter support 210 of FIG. 8.

More specifically, FIGS. 8 and 9 illustrate a filter support 210 including first curved support ribs 220a–220c and second curved support ribs 230a–230c. All of the support ribs are generally sinusoidal in shape as seen in the plan view of FIG. 8. The first support ribs 220a–220c are preferably attached to the second support ribs 230a –230c at the points of intersection. As a result, no separate cross-supports are provided. One such point of intersection is designated by reference numeral 222 in FIG. 8. Because the first support ribs 220a–220c and second support ribs 230a–230c have heights that are less than the full height of the support 210 (see FIG. 9), openings across the width of the support 210 are maintained (where the width is transverse to the longitudinal axis 211).

Figure 10:
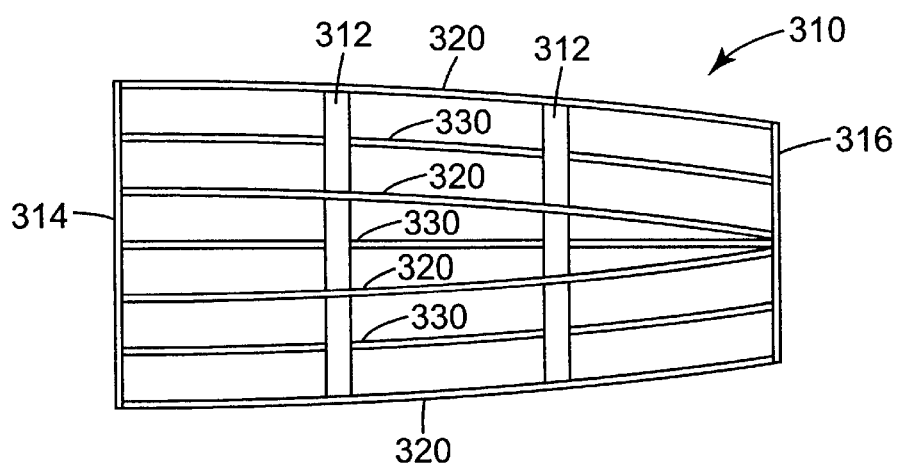
FIG. 10 is a plan view of another filter support 310 according to the present invention.

FIG. 10 is a plan view of another filter support 310 including first support ribs 320 on one side of the filter support 310 and second support ribs 330 on the opposite side of the support 310. The width of the support 310 as measured transverse to the longitudinal axis 311 narrows from the input end 314 to the terminal end 316 of the support 310. Cross-members 312 are provided to maintain proper spacing between all of the support ribs 320 and 330.

Figure 11:
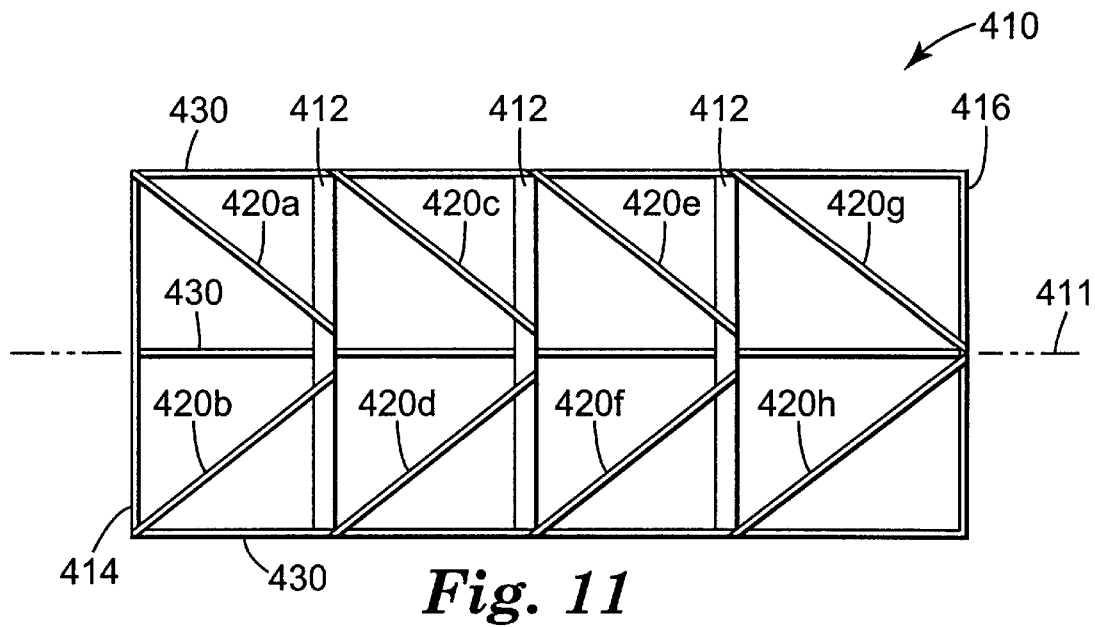
FIG. 11 is a plan view of another filter support 410 according to the present invention.
Figure 12:
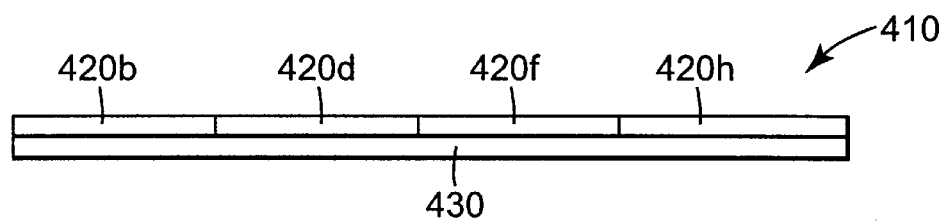
FIG. 12 is a side view of the filter support 410 of FIG. 11.

FIGS. 11 and 12 illustrate another filter support 410 including angled first support ribs 420a–420h on one side of the filter support 410 and longer second support ribs 430 on the opposite side of the filter support 410. The longer second support ribs 430 preferably extend substantially the entire length of the support 410 along the longitudinal axis 411. The filter support 410 also includes cross members 412 that preferably extend across the width of the support 410 transverse to the longitudinal axis 411.

Each pair of angled first support ribs 420a/420b, 420c/420d, 420e/420f, 420g/420h are preferably oriented such that the distance between the support ribs across the width of the filter support 410 decreases along the length of the filter support 410 when moving from the input end 414 to the terminal end 416. Except for the pair of support ribs 420g/420h, it is preferred that each pair of support ribs does not meet but, instead, provides an opening through which air can pass along the length of the filter support 410.

Figure 13:
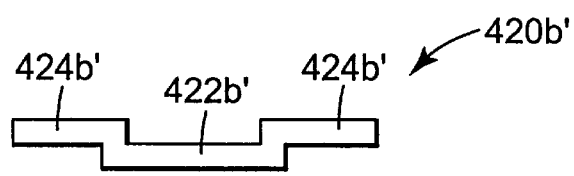
FIG. 13 is an enlarged side view of one alternative support rib 420' for use in a filter support.
Figure 14:
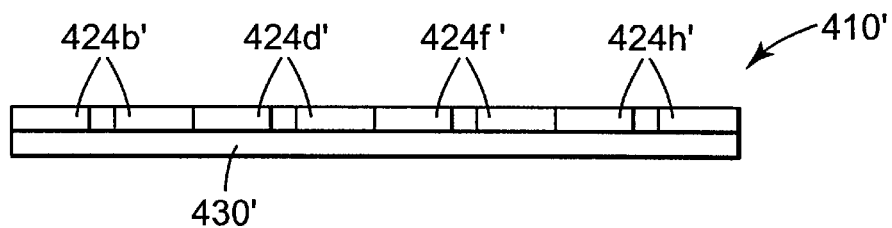
FIG. 14 is a side view of a filter support 410' including support ribs 420' as illustrated in FIG. 13.

A variation in the filter support 410 of FIGS. 11 and 12 is depicted in FIGS. 13 and 14. One of the angled support ribs 420b' is illustrated in FIG. 13 and includes a stepped shaped such that the lower support rib portion 422b' lies within the area occupied by the second support ribs 430' in filter support 410' as seen in FIG. 14. The upper portions 424b' of the support rib 420b' are, however, located on the upper side of the filter support 410'. This variation may further improve airflow distribution within the filter support 410'.

The filter supports depicted in FIGS. 8, 10 and 11 illustrate variations in one feature of all filter supports manufactured according to the present invention, i.e., support ribs that are generally aligned with a longitudinal axis. As indicated above in the glossary, "generally aligned with the longitudinal axis" means that the support ribs progress along the longitudinal axis when moving from the input end of the filter support to the terminal end of the filter support. In some filter supports, such as those depicted in FIGS. 5 and 15 (see below), the support ribs are generally parallel to the longitudinal axis of the filter support. The filter supports of FIGS. 8, 10 and 11 include support ribs that are, however, curved or angled such that they traverse at least partially across the width of the filter support as they progress along the longitudinal axis.

Figure 15:
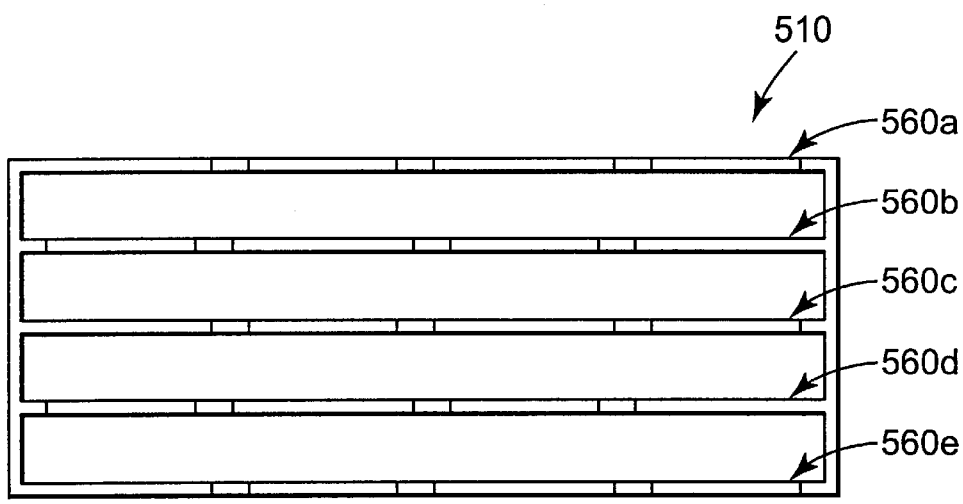
FIG. 15 is a plan view of a filter support 510 according to the present invention.
Figure 16:
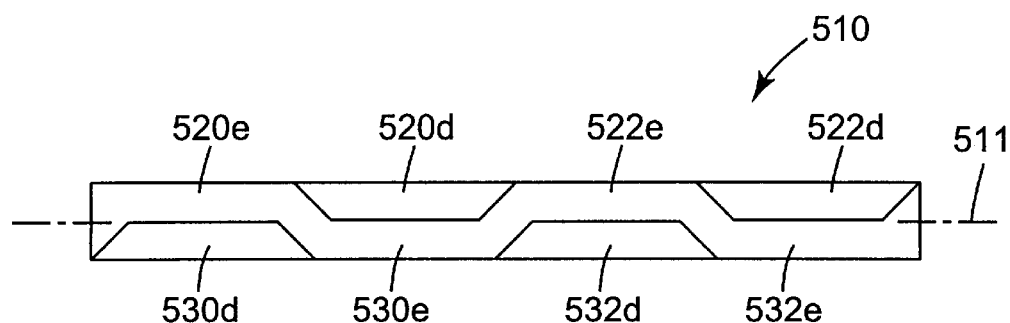
FIG. 16 is a side view of the filter support 510 of FIG. 15.
Figure 17:
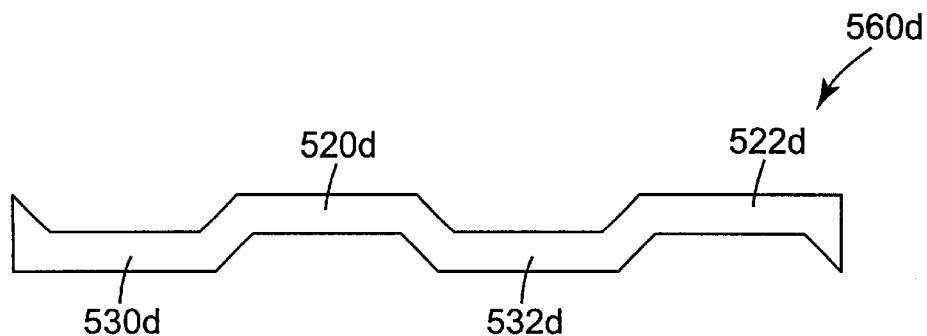
FIG. 17 is a side view of one support member 560*d* of the filter support 510 of FIGS. 15 and 16.

FIGS. 15–17 depict yet another filter support 510 that includes a plurality of support members 560a–560e that extend along the length of the filter support 510. Each of the members 560a–560e has a stepped shape including upper support rib portions interconnected with lower support rib portions in a stepped fashion. FIG. 16, a side view of the filter support 510, depicts the entire length of member 560e including upper support ribs 520e and 522e and lower support ribs 530e and 532e. The entire length of member 560d is depicted in FIG. 17. Adjacent support ribs, e.g., 560d and 560e, are preferably mirror images of each other (mirrored about axis 511 as seen in FIG. 16). As a result of the complementary nature of the members 560, the upper support ribs 520d and 522d of member 560d are seen FIG. 16 along with the lower support ribs 530d and 532d of member 560d (the rest of which is hidden behind member 560e).

The preceding specific embodiments are illustrative of the practice of the invention. This invention may suitably be practiced in the absence of any element or item not specifically described in this document. The complete disclosures of all patents, patent applications, and publications identified herein are incorporated into this document by reference in their entirety as if individually incorporated. Various modifications and alterations of this invention will become apparent to those skilled in the art without departing from the scope of this invention, and it should be understood that this invention is not to be unduly limited to the illustrative embodiments set forth herein.

What is claimed is:

1. A powered air purifying respirator comprising:
    a helmet comprising a crown space;
    a filter assembly located within the crown space of the helmet, the filter assembly comprising a filter and a filter support, the filter support comprising a longitudinal axis extending between an input end and a terminal end, the filter support further comprising:
        two or more first support ribs on a convex first side of the filter support, each of the first support ribs being generally aligned with the longitudinal axis of the filter support; and
        two or more second support ribs on a concave second side of the filter support, the concave second side being opposite the convex first side of the filter support and each of the second support ribs being generally aligned with the longitudinal axis;
        wherein at least one of the first support ribs is laterally offset from each of the second support ribs along a transverse axis that is transverse to the longitudinal axis.

2. The powered air purifying respirator of claim 1, wherein the filter comprises a filter bag.

3. The powered air purifying respirator of claim 1, wherein all of the first support ribs are laterally offset from all of the second support ribs along the transverse axis.

4. The powered air purifying respirator of claim 1, wherein the filter support comprises more second support ribs than first support ribs.

5. The powered air purifying respirator of claim 1, wherein each of the first support ribs and each of the second support ribs extend from the input end to the terminal end.

6. The powered air purifying respirator of claim 1, wherein the filter support further comprises a width as measured along the transverse axis, and further wherein at least one of the first support ribs traverses at least partially across the width of the filter support as the first support rib progresses along the longitudinal axis away from the input end of the filter support.

7. The powered air purifying respirator of claim 1, wherein the first support ribs and the second support ribs are generally parallel to the longitudinal axis of the filter support.

8. The powered air purifying respirator of claim 1, wherein at least one of the first support ribs and at least one of the second support ribs extend from the input end of the filter support to the terminal end of the filter support.

9. The powered air purifying respirator of claim 1, further comprising a width as measured along the transverse axis, wherein the second support ribs located at outermost positions along the width of the filter support have a height as measured between the first and second sides of the filter support that is less than the height of the second support ribs located between the outermost positions.

10. The powered air purifying respirator of claim 1, wherein the height of the second support ribs as measured between the first and second sides of the filter support increases proximate an input end of the filter support.

11. The powered air purifying respirator of claim 1, further comprising a width as measured along the transverse axis, wherein at least one of the first support ribs traverses at least partially across the width of the filter support as the first support rib progresses along the longitudinal axis away from the input end of the filter support.

12. The powered air purifying respirator of claim 1, wherein the first support ribs are generally parallel to the longitudinal axis.

13. The powered air purifying respirator of claim 1, wherein the first support ribs and the second support ribs are generally parallel to the longitudinal axis.

14. The powered air purifying respirator of claim 1, wherein the first and second support ribs are constructed of high density polyethylene and a thermoplastic elastomer.

* * * * *